J. N. WOOD.
BALE BOX.
APPLICATION FILED SEPT. 16, 1909.
971,948.
Patented Oct. 4, 1910.
3 SHEETS—SHEET 1.
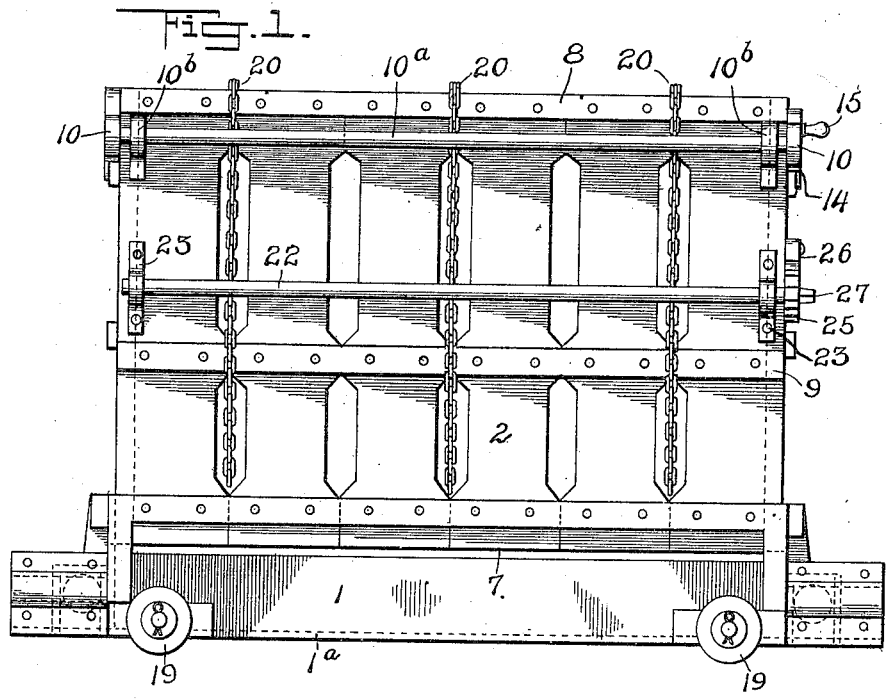
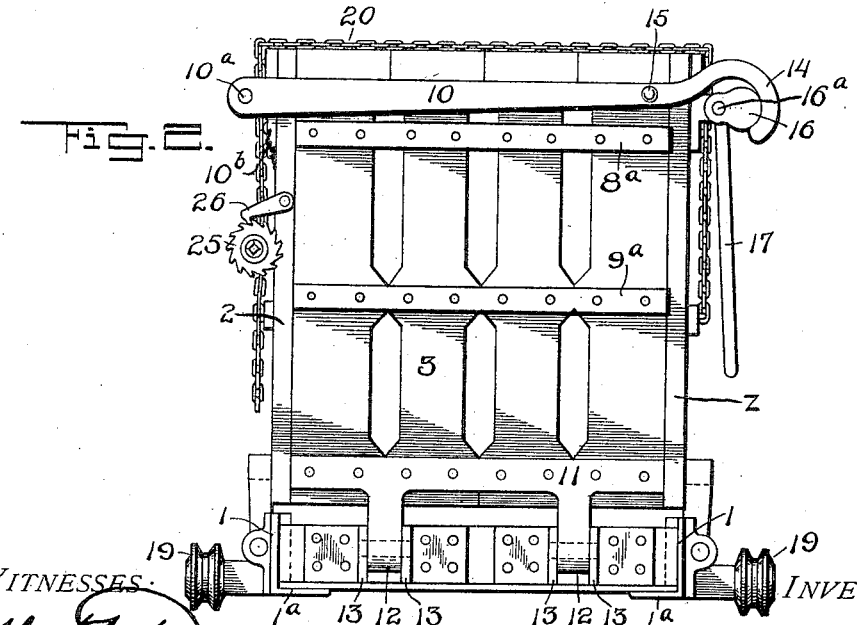
WITNESSES
INVENTOR
James Nelson Wood
BY
Whitaker Prevost Attorney

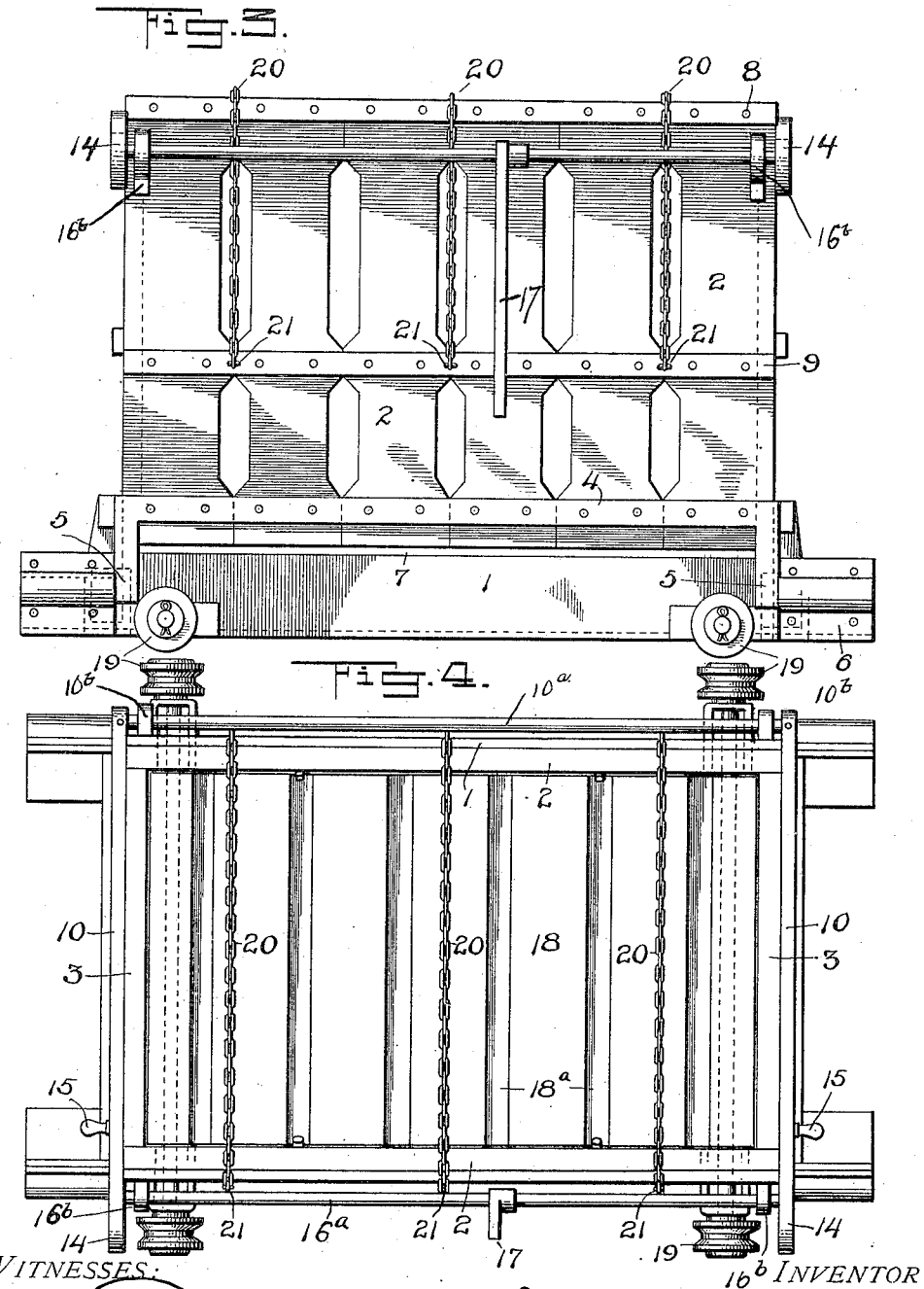

J. N. WOOD.
BALE BOX.
APPLICATION FILED SEPT. 16, 1909.

971,948.

Patented Oct. 4, 1910.

3 SHEETS—SHEET 3.

WITNESSES:
Wm F Koyle
R. E. Barry

INVENTOR
James Neleon Wood
BY
Whitaker Prevost
Attorneys.

UNITED STATES PATENT OFFICE.

JAMES N. WOOD, OF RICHMOND, VIRGINIA, ASSIGNOR TO THE NEELY COMPRESS AND COTTON COMPANY, INC., OF RICHMOND, VIRGINIA.

BALE-BOX.

971,948.        Specification of Letters Patent.        Patented Oct. 4, 1910.

Application filed September 16, 1909. Serial No. 518,058.

*To all whom it may concern:*

Be it known that I, JAMES N. WOOD, citizen of the United States, residing at Richmond, in the county of Henrico and State of Virginia, have invented certain new and useful Improvements in Bale-Boxes; and I do hereby declare the following to be a full, clear, and exact description of the invention, such as will enable others skilled in the art to which it appertains to make and use the same.

My invention consists in the novel features hereinafter described, reference being had to the accompanying drawings which illustrate one form in which I have contemplated embodying my invention and said invention is fully disclosed in the following description and claims.

Figure 5:
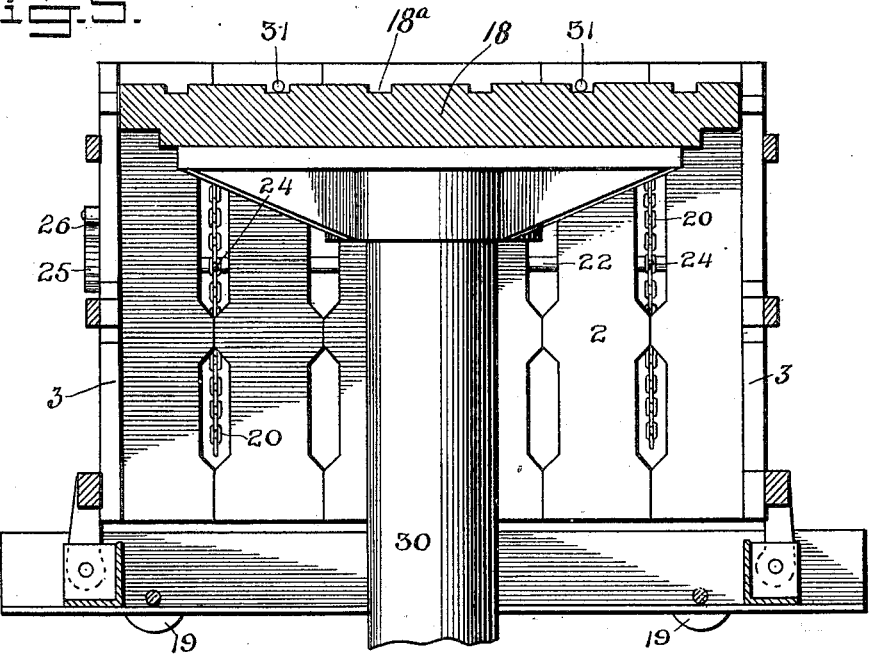
Figure 6:
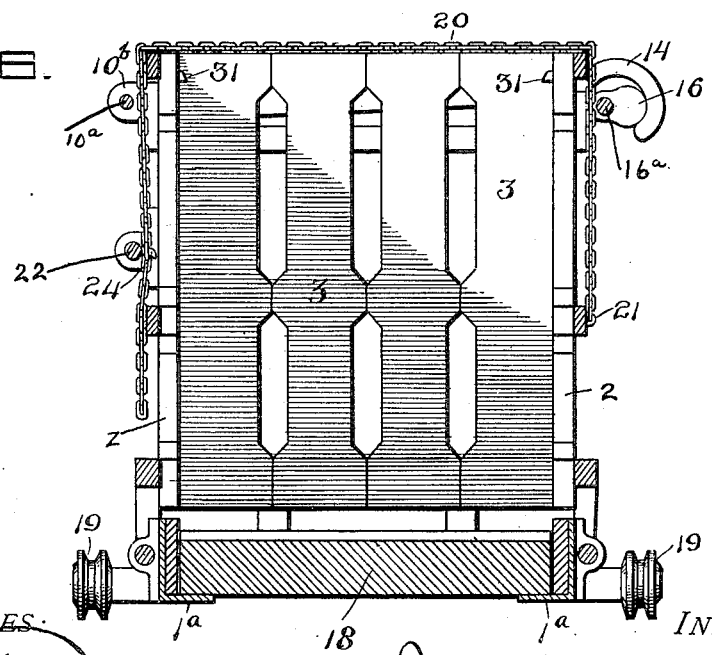

Referring to the said drawings, Figure 1 is a side elevation of a bale box embodying my invention. Fig. 2 is an end elevation of the same. Fig. 3 is a side elevation, similar to Fig. 1, but showing the opposite side of the box. Fig. 4 is a top plan view of the box. Fig. 5 is a longitudinal sectional view of the box showing the bottom raised by the plunger of the press. Fig. 6 is a transverse sectional view of the box with the bottom in its lowest position.

The object of my invention is to provide a knock down bale box for use in connection with baling presses in which the bale is formed within the box and removed with the box from the press, for the purpose of wrapping the bale and applying the bale band and said box is specially adapted for use with the type of baling press shown and described in my former applications for Letters Patent, Serial No. 479,380, filed Feb. 23, 1909 and Serial No. 487,229, filed April 1, 1909, although it may be used with other forms of baling press.

As illustrated in the drawings, my improved bale box comprises an open bottom frame 1 of rectangular shape and preferably formed of metal, to which are hinged in any suitable manner two sides 2, 2 and two ends 3, 3. In the exemplification of my invention which I have selected for illustration, the sides and ends are formed of heavy wooden pieces and connected and reinforced in any suitable way. The sides and ends may, however, be made of metal or other suitable material. As shown the sides 2, 2 are each provided with a bar 4 near the bottom, the ends of which extend downward and are provided with trunnions 5 engaging bearings 6 on the bottom frame 1, forming hinge connections with the bottom frame. The lower edges of the sides 2, 2 are slightly higher than the bottom frame, leaving a horizontal slit 7 through which the ends of the burlap cover for the bale may project. Each side 2 is provided adjacent to the top with a horizontal reinforcing bar 8 and I prefer to employ a similar bar 9 between the upper and lower edges.

The ends 3, 3 are provided near their lower edges each with a reinforcing bar 11 from which depend the hinge members 12, pivotally connected to brackets 13, 13 secured to the bottom frame and said ends are also preferably provided with the top and median reinforcing bars $8^a$ and $9^a$. In order to securely lock the sides and ends together when in raised position, I provide one of the sides 2 with a pair of locking arms pivotally secured thereto and extending across the box outside of the ends 3, 3 and having hook shaped portions projecting beyond the other side 2 of the box, when the box is in closed position. For convenience in operation, I prefer to have the two locking arms connected together for joint or simultaneous operation and to this end the two arms 10, 10 are rigidly connected to and extend perpendicularly from a shaft $10^a$ mounted in bearings $10^b$ secured to the side 2 as clearly shown in Figs. 1 and 2. The arms 10, 10 may be made separate from and pinned or otherwise secured to the shaft $10^a$, as here shown, or the arms and shaft may be an integral forging if preferred. Each of the locking arms 10 is provided at its free end with a hook portion 14 and adjacent to its free end is a handle 15 by means of which the locking arms can be conveniently raised and lowered by hand. The other side 2 is provided with a rock shaft $16^a$ mounted in bearings $16^b$ and carrying at its opposite ends locking cams or eccentrics 16, 16 so located as to engage the hook portions 14, 14 of the locking arms 10, 10. The rock shaft $16^a$ is also provided with an operating arm 17 by which it may be rocked.

The construction of the parts just described is such that when the box is closed by raising the sides and ends into vertical position, as illustrated in the drawings, the operating arm 17 will be raised so as to bring the eccentrics 16 into their upper positions and the locking arms will be swung over until the hook portions thereof engage the eccentrics 16, which they will readily do. The operating arm 17 is then depressed, as shown in Fig. 2, thus rocking the shaft 16ª and moving the eccentrics 16 into a substantially horizontal position within the hook portions 14 of the locking arm and straining the side portions 2, 2 firmly against the end portions 3, 3. After the bale has been formed within the bale box and it is desired to open the box to discharge the bale therefrom, the arm 17 is raised, thus relieving the hooks 14 of the locking arms 10, and permitting the locking arms to be readily swung upwardly out of engagement with the eccentrics and over to the other side of the side 2 to which they are connected, thus releasing both the sides and ends and permitting them to swing downward into horizontal position to permit the removal of the bale.

18 represents the bottom of the bale box which is formed of wood or metal, as preferred, and preferably rests upon the bottom frame 1. The bottom frame is preferably formed of angle pieces, the horizontal members of which extend inwardly, as indicated at 1ª and form the support for the bottom 18. The bottom 18 is preferably movable vertically within the walls 2, 2, and 3, 3 and is provided on its upper face with a plurality of transverse grooves 18ª to facilitate the insertion of the bale bands, in a well known way. The bottom frame is also provided with rollers 19, 19 which project below the bottom frame and serve to support the box, thereby permitting it to be readily moved across the baling floor and into and out of the press. The rollers 19 are preferably grooved, as shown, to engage track portions of the baling frame, when used with the type of press illustrated in my applications before referred to.

I also provide means for positively retaining the bale within the bale box after it has been formed under great pressure in the baling press, in order to prevent any material expansion of the bale until it can be removed from the press and secured by the usual bale bands. To this end I provide a plurality of chains 20 or other flexible connections, which are preferably permanently secured to one of the sides 2 and are adapted to be drawn over the top of the bale and secured to the opposite side 2 of the bale box. In this instance, I have shown three chains 20, each of which has one end secured as indicated at 21, to one of the sides 2. The opposite side 2 is provided with a winding shaft 22 mounted in bearings 23 and provided with projections or hooks 24 in line with the chains 20 and adapted to engage the same. The shaft 22 is also provided with a ratchet wheel 25 and locking pawl 26 in order to secure the shaft in any position to which it may be turned. The shaft 22 is also provided with means for rotating the same, such as a crank and for convenience I prefer to provide the shaft with a polygonal portion 27 to receive a detachable crank or operating arm, when it is desired to rotate the shaft. After the bale has been formed, the chains 20 are passed over the top of the bale and the free ends secured to the hooks 24 and the shaft 22 is then rotated to wind up the slack portions of the chains so as to draw the horizontal portions thereof above the bale tightly down upon the bale, while it is in a compressed condition and hold it against expansion while the bale box is removed from the press and until the bale bands, or some other confining means, have been applied to the bale.

When the bale box is in the press the bottom 18 is adapted to be engaged by the plunger of the hydraulic pressure device indicated at 30. The bottom of the box is raised within the box before the commencement of the baling operation, by the said plunger, as shown in Fig. 5 and when near the top engages short studs 31, 31 on the sides 2 of the box so that further upward movement of the plunger will raise the box bodily with the bottom into operative relation with the baling devices, as set forth in my former applications.

It will be noted that the two shafts or bars 10ª and 16ª with the lateral locking arms 10 form a rectangular locking frame which completely incloses and surrounds the box when the latter is in closed position.

What I claim and desire to secure by Letters Patent is:—

1. The combination with a bale box provided with hinged walls, of a shaft secured to one of the side walls, and provided at each end with perpendicular locking arms connected with said shaft, and adapted to engage the exterior of the adjacent end walls, the other side wall being provided with a shaft extending longitudinally thereof and provided with means adjacent to each end for detachably engaging said locking arms, whereby said shafts and locking arms form a rectangular frame entirely surrounding the box when the latter is in closed position.

2. The combination with a bale box provided with hinged walls, of a longitudinally disposed bar secured to one of the side walls, a longitudinally disposed bar secured to the opposite side wall, one of said bars being provided with perpendicular locking arms rigidly secured thereto for joint movement and having their free ends constructed to engage the other of said longitudinal bars, said bars and locking arms forming a rectangular frame entirely surrounding the box, when the latter is in closed position.

3. The combination with a bale box provided with oppositely disposed hinged walls, of a shaft rotatably secured to one of said walls, a pair of locking arms connected with said shaft and provided with hook portions at their opposite ends, a rock shaft secured to the opposite wall, eccentric devices on said rock shaft in position to engage said hook portions, and an operating device for said rock shaft.

4. The combination with a bale box having hinged side and end walls, of a pair of locking arms, pivotally secured to one of the side walls, and connected together for joint movement, said arms being located outside of the end walls when the box is in closed position and being provided at their outer ends with hook portions, of a rock shaft secured to the opposite side wall, eccentric devices on said rock shaft in position to be engaged by said hook portions, and means for rotating said rock shaft and eccentric devices.

5. The combination with a bale box, of flexible bale retaining devices, means for securing the same to the bale box at one side of the same, and means for adjustably securing said flexible retaining devices, to the opposite side of the box.

6. The combination with a bale box, of flexible bale retaining devices, means for securing said devices to one side of the box, winding mechanism secured to the opposite side of the box, and means for connecting said retaining devices to the winding mechanism.

7. The combination with a bale box, of flexible bale retaining devices, secured to the box at one side, a winding shaft secured to the opposite side of said box, a ratchet and pawl mechanism for said shaft, and devices on said shaft for detachably engaging said flexible bale retaining devices.

In testimony whereof I affix my signature, in the presence of two witnesses.

JAMES N. WOOD.

Witnesses:
  Susie Wood,
  Lillian Wayt.